(12) United States Patent
Hamachi

(10) Patent No.: US 11,107,058 B2
(45) Date of Patent: Aug. 31, 2021

(54) HARVEST CUSTOMER TRACKING INFORMATION

(71) Applicant: PAYPAL, INC., San Jose, CA (US)

(72) Inventor: Gordon Taro Hamachi, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 989 days.

(21) Appl. No.: 14/795,858

(22) Filed: Jul. 9, 2015

(65) Prior Publication Data

US 2015/0324814 A1 Nov. 12, 2015

Related U.S. Application Data

(63) Continuation of application No. 13/468,825, filed on May 10, 2012, now abandoned.

(51) Int. Cl.
*G06Q 30/02* (2012.01)
*G06Q 20/32* (2012.01)

(52) U.S. Cl.
CPC ..... *G06Q 20/3224* (2013.01); *G06Q 30/0201* (2013.01)

(58) Field of Classification Search
None
See application file for complete search history.

(56) References Cited

U.S. PATENT DOCUMENTS

2005/0055430 A1\* 3/2005 Parupudi ............. G06F 17/3087 709/222
2006/0136530 A1 6/2006 Rossmann
(Continued)

FOREIGN PATENT DOCUMENTS

CN 101911668 12/2010
CN 101978370 2/2011
(Continued)

OTHER PUBLICATIONS

Donghoon Lee et al. Understanding human-place interaction from tracking and identification of many users. Dept, of Electr. & Comput. Eng., Seoul Nat. Univ., Seoul, South Korea. 2013 IEEE 1st International Conference on Cyber-Physical Systems, Networks, and Applications (CPSNA) (pp. 112-115). (Year: 2013).\*
Sharma Sonia. Wireless sensor network and security. Department of C. Sc.& Applications, Hindu Girls College, Jagadhri, Haryana, India. 2016 3rd International Conference on Computing for Sustainable Global Development (INDIACom) (pp. 3301-3304). (Year: 2016).\*

(Continued)

*Primary Examiner* — Patricia H Munson
*Assistant Examiner* — Nancy N Prasad
(74) *Attorney, Agent, or Firm* — Haynes and Boone, LLP

(57) ABSTRACT

An embodiment of a system comprises one or more processors; and one or more memories adapted to store machine-readable instructions which when executed by the processor(s) cause the system to: receive tracked user device information from a distributed network of sensors configured for tracking user device information associated with one or more user devices of corresponding users in a proximity of the distributed network of sensors, wherein the user device information is tracked even when the corresponding users have not opted in the one or more user devices to be tracked by the distributed network of sensors; store the tracked user device information in a tracking database, wherein the tracked user device information is stored even for corresponding users that have not been identified and is for later use when such corresponding users are identified; and analyze the tracked user device information to infer interests of the corresponding users.

20 Claims, 3 Drawing Sheets

(56) References Cited

U.S. PATENT DOCUMENTS

| | | | | |
|---|---|---|---|---|
| 2008/0189170 A1* | 8/2008 | Ramachandra | ........ | G06Q 30/02 |
| | | | | 705/7.29 |
| 2010/0323730 A1* | 12/2010 | Karmarkar | .............. | H04L 51/38 |
| | | | | 455/466 |
| 2011/0295690 A1* | 12/2011 | Steinmetz | .......... | G06Q 30/0257 |
| | | | | 705/14.55 |
| 2012/0315978 A1* | 12/2012 | LeMay | ............... | G07F 17/3239 |
| | | | | 463/25 |

FOREIGN PATENT DOCUMENTS

| | | | | |
|---|---|---|---|---|
| CN | 105116854 A | * | 12/2015 | .............. Y02P 90/02 |
| WO | WO 02/019224 A1 | | 3/2002 | |

OTHER PUBLICATIONS

Declan Mccullagh: "FBI taps cell phone mic as eavesdropping tool—CNET", Dec. 4, 2006 (Dec. 4, 2006), pp. 1-4, XP055224246, Retrieved from the Internet: URL:http://www.cnet.com/news/fbi-taps-cell-phone-mic-as-eavesdropping-tool/, retrieved on Oct. 28, 2015.

Jan-Keno Janssen: "Wo bist'n du?—Googles Geodienst Latitude", c't Mar. 2011, Jan. 17, 2011 (Jan. 17, 2011), pp. 86-88, XP055205403, Retrieved from the Internet: URL:http://www.heise/de/artikel-archiv/ct/2011/03/086/@00250@/ct.11.03.086-088.pdf, retrieved on Jul. 30, 2015.

Chinese Search Report issued in Application No. 201380024456.5, dated Nov. 18, 2016, 10 pages.

* cited by examiner

HARVEST CUSTOMER TRACKING INFORMATION

CROSS-REFERENCE TO RELATED APPLICATION

This application is a continuation of and claims priority to U.S. patent application Ser. No. 13/468,825 filed May 10, 2012, which is incorporated herein by reference in its entirety.

BACKGROUND

Technical Field

Embodiments of the present disclosure generally relate to customer information, and more particularly, to methods and systems for harvest of customer tracking information.

Related Art

Customers regularly engage in transactions at a seller's location, for example, to purchase a service or an item at a retail store. The customers may generally walk around the seller's location to peruse the different items or services offered by the seller before they may purchase the item or service. To complete a transaction, customers may use rewards or club cards and a transaction card or a mobile device for payment.

SUMMARY

As will be further described herein in relation to various embodiments, methods and systems are provided for harvesting of customer tracking information, such that, for example, the locations of customers are tracked by their mobile devices, and identity information is associated with the mobile devices.

In accordance with an embodiment of the disclosure, a system comprises one or more processors; and one or more memories in communication with the one or more processors and adapted to store a plurality of machine-readable instructions which when executed by the one or more processors are adapted to cause the system to: receive tracked user device information from a distributed network of sensors configured for tracking user device information associated with one or more user devices of corresponding users in a proximity of the distributed network of sensors, wherein the user device information is tracked even when the corresponding users have not opted in the one or more user devices to be tracked by the distributed network of sensors; store the tracked user device information in a tracking database, wherein the tracked user device information is stored even for corresponding users that have not been identified and is for later use when such corresponding users are identified; and analyze the tracked user device information to infer interests of the corresponding users.

In accordance with another embodiment of the disclosure, a method comprises receiving, electronically by a processor, user device information associated with one or more user devices of corresponding users located proximate to and tracked by a distributed network of sensors, wherein the user device information is tracked even when the corresponding users have not opted in to participate. The method also comprises storing, electronically by the processor, the tracked user device information in a tracking database, wherein the tracked user device information is stored even for corresponding users that have not been identified and is for later use when such corresponding users are identified. The method further comprises analyzing the tracked device information to infer interests of the corresponding users.

In accordance with another embodiment of the disclosure, a non-transitory computer readable medium on which are stored computer readable instructions and, when executed by a processor, cause the processor to: receive user device information associated with one or more user devices of corresponding users located proximate to and tracked by a distributed network of sensors, wherein the user device information is tracked even when the corresponding users have not opted in to participate; store the tracked user device information in a tracking database, wherein the tracked user device information is stored even for corresponding users that have not been identified and is for later use when such corresponding users are identified; and analyze the tracked device information to infer interests of the corresponding users.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

Figure 1:
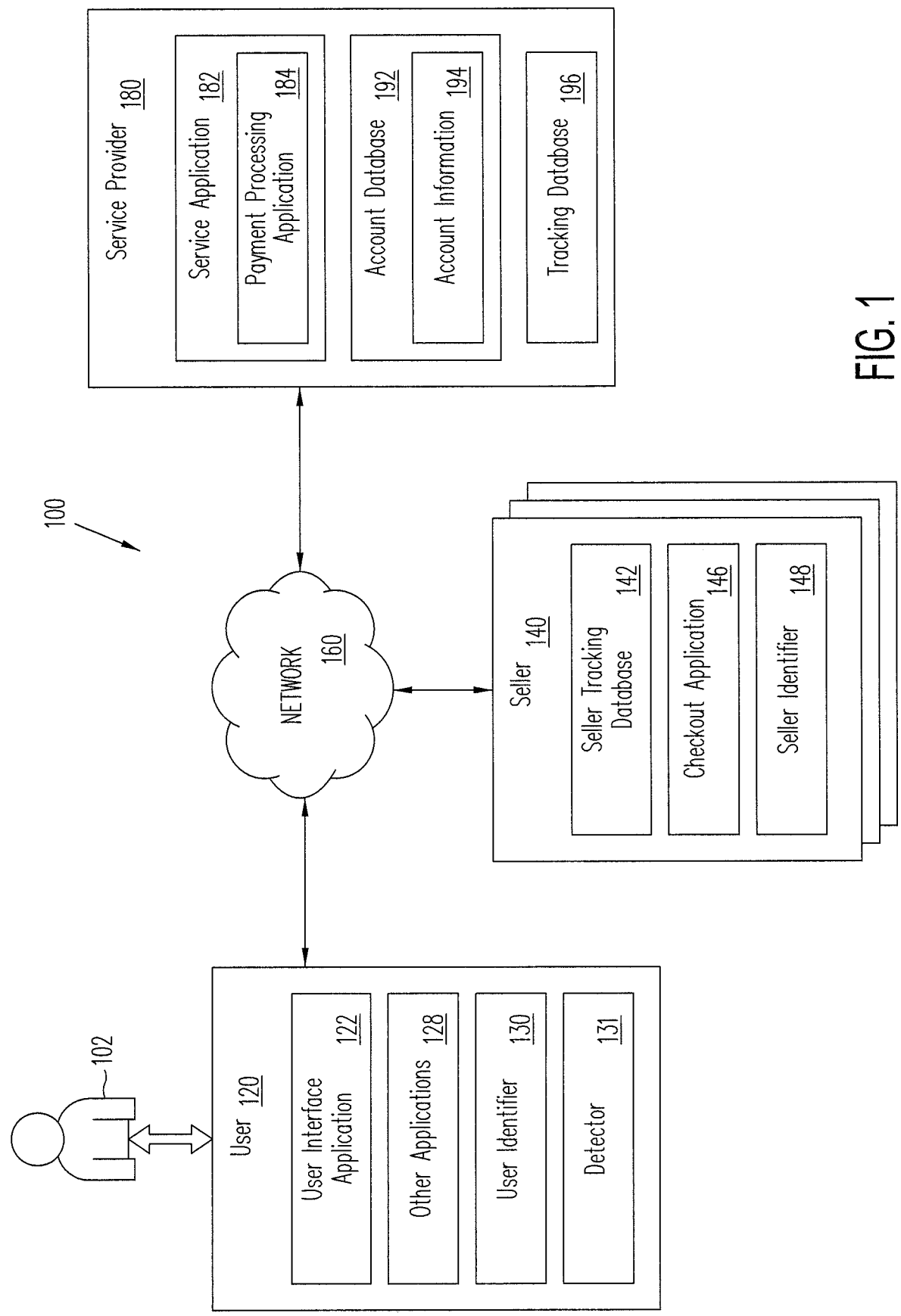
FIG. 1 is a block diagram illustrating a system for tracking user device information according to an embodiment of the present disclosure.

In accordance with various embodiments described herein, methods and systems are provided for harvesting of customer tracking information. In an embodiment, the proximity of user devices such as cell phones may be detected by sensors located at a place of business, e.g., at a retail store. Multiple sensors may be used to track the presence and movement of customers inside the place of business. This information may be useful to businesses for any number of purposes. For example, retailers may find this information useful for general analytics, store layout, customer flow, departments or products of interest to specific customers and/or other useful purposes.

In other embodiments, an application may be provided from a service provider to customers such that the customers may choose to load or install and run the application on their user devices. The application may enable detection of other nearby user devices (e.g., user devices of other customers, even those not having the application) and may upload this information (e.g., information regarding the locations of nearby user devices) to a tracking database. In some embodiments, WiFi packet sniffing, near field communication (NFC) or other suitable technologies may be used for discovering and tracking the locations of user devices. As such, a distributed network of sensors is provided that may track the locations of all nearby user devices. The application may be provided by a service provider such as PayPal® and/or eBay® of San Jose, Calif.

In addition to tracking customers by their user devices, for example, by sensors in a business location and/or by an application enabling tracking of locations of customers, customer identity information may also be associated with the user devices. The user devices may be associated with the corresponding customers in any number of ways. For example, a user device may be associated with the corresponding customer at a business location point of sale, where the customer may disclose his or her identity when paying by credit card or any other transaction card, or when using a club or rewards card. In another example, the customer's identity may be determined by having customers register their user devices with the service provider in exchange for an incentive such as a reward or contest entry.

Once the customer's identity is associated with a particular user device, the identity information may be used along with any previously-gathered tracking information to understand what products interest specific customers, at all business locations that he or she visits.

As such, customers may be discovered and tracked by their user devices without the customers necessarily having to have awareness, knowledge, provide consent, or otherwise having to opt in. A distributed network of sensors on certain user devices may be created, possibly in conjunction with sensors located at a place of business, such that customers may be identified and tracked, even those who may not have opted into the system.

Referring now to the drawings wherein the showings are for purposes of illustrating embodiments of the present disclosure only, and not for purposes of limiting the same, FIG. 1 is a block diagram illustrating a system for tracking user device information according to an embodiment of the present disclosure.

FIG. 1 illustrates an embodiment of a block diagram of a system 100 adapted to track and identify a customer 102 associated with a user device 120. As shown in FIG. 1, the system 100 includes at least one user device 120 (e.g., network computing device), one or more seller servers or devices 140 (e.g., network server devices), and at least one service provider server or device 180 (e.g., network server device) in communication over a network 160.

The network 160, in one embodiment, may be implemented as a single network or a combination of multiple networks. For example, in various embodiments, the network 160 may include the Internet and/or one or more intranets, cloud, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, seller servers or devices 140, and service provider server or device 180 may be associated with a particular link (e.g., a link such as a URL (Uniform Resource Locator) to an IP (Internet Protocol) address).

The user device 120, in various embodiments, may be implemented using any appropriate combination of hardware and/or software configured for wired and/or wireless communication over the network 160. In various examples, the user device 120 may be implemented as a wireless telephone (e.g., cellular, mobile, etc.), a smart phone, a tablet, a personal digital assistant (PDA), a personal computer, a notebook computer, and/or various other generally known types of wired and/or wireless computing devices. It should be appreciated that the user device 120 may be referred to as a client device, a mobile device, or a customer device without departing from the scope of the present disclosure.

The user device 120, in one embodiment, includes a user interface application 122, which may be utilized by the user 102 to conduct transactions such as financial transactions (e.g., shopping, purchasing, bidding, etc.) with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access seller websites or lists of inventories via the one or more seller servers or devices 140 to view and select items and/or services for purchase, and the user 102 is able to purchase items and/or services from the one or more seller servers or devices 140 via the service provider server 180. Accordingly, the user 102 may conduct transactions such as financial transactions (e.g., view, purchase and pay for items and/or services) from the one or more seller servers or devices 140 via the service provider server 180.

The user device 120, in various embodiments, may include other applications 128 as may be desired in one or more embodiments of the present disclosure to provide additional features available to the user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, the user interface application 122 or the other applications 128 include an application that may be loaded on user device 120 from service provider server 180 or from a seller server 140. Such application enables user device 120 to detect other nearby user devices (even ones not running the application). One or more sensors or detectors 131 may detect the other nearby user devices, for example, by using the user device's WiFi as nearby user devices are located in a proximity of the user device 120, such as in front of a hotspot WiFi, Bluetooth range, or the like. In addition, the application enables uploading of the detected information, for example, the locations of nearby user devices to a tracking database 196 of service provider server 180 or to a seller tracking database 142 of seller server 140. User 102 may get incentives such as rewards from a seller associated with seller server 140 for installing and running the application and providing the data or detected information.

In various embodiments, the information tracked by user device 120 (having the downloaded application) may supplement information tracked by fixed sensors located within a business or seller's location. Such fixed sensors may be generally positioned at known locations and always available as will be described in more detail below with respect to the embodiment of FIG. 2. As such, a distributed network of sensors for tracking the locations of all nearby user devices is provided. The network of sensors may be used to gather information about signals (e.g., radio signals) transmitted by the user devices. Raw signal strength information along with known locations of the sensors may be converted into user device locations.

Once the information about user devices has been detected, the users may be associated with the corresponding user devices. This association may be accomplished in a number of ways. For example, at a point of sale of a seller location where a customer discloses his or her identity when paying by credit card, other transaction card, or when using a club or rewards card or any other identifying means. Another example for association of a user with the corresponding user device may involve having users opt in or register their user devices with the system in exchange for an incentive such as a reward or contest entry. It should be noted that it may not be necessary for the user to opt in at the point of sale; for instance, if the user pays by credit card or other identifying means, the identifying information may be matched to the user's device by placing device sensors at the point of sale.

In an embodiment, user device 120 may include at least one user identifier 130, which may be implemented, for example, as operating system registry entries, cookies associated with the user interface application 122, identifiers associated with hardware of the user device 120, or various other appropriate identifiers. The user identifier 130 may include one or more attributes related to user 102, such as personal information related to user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, user identifier 130 may be passed with a user login request to the service provider server 180 via the network 160, and the user identifier 130 may be used by the service provider server 180 to associate the user 102 with a particular user account maintained by the service provider server 180.

The one or more seller servers or devices 140, in various embodiments, may be maintained by one or more individuals or business entities, profit or non-profit (or in some cases, by a partner of a business entity that processes transactions on behalf of business entities). It should be appreciated that individuals or business entities may also be referred to as "sellers" or "merchants" without departing from the scope of the present disclosure. Examples of sellers include merchant sites or locations such as retail stores, resource information sites or locations, utility sites or locations, real estate management sites or locations, etc., which may offer various items and/or services for purchase and payment.

In some embodiments, users may opt in or register user identity information with the sellers in exchange for an incentive such as a reward or a contest entry. In other embodiments, users may opt in or register user identity information with the sellers or with the service provider over the network 160. In various embodiments, users may opt in or register with the system in various manners, for example, a user may respond to an invitation such as a pop-up message on the user device when the user is in or close to a business location asking the user whether he or she wants to "opt in" or have movements tracked within the business location. In other embodiments, the user may opt in or register when loading the application on the user device as described above, for example, as a one-time opt-in feature on the application.

As such, each of the one or more seller servers 140 may include a seller tracking database 142 for detecting, tracking and/or identifying users and their associated user devices. It should be appreciated that although a user-seller transaction is illustrated in this embodiment, the system may also be applicable to user-user, seller-seller and/or seller-user transactions.

Each of the seller servers or devices 140, in one embodiment, may include a checkout application 146, which may be configured to facilitate financial transactions (e.g., purchase transactions) by the user 102 of items and/or services offered by the seller. As such, in one aspect, the checkout application 146 may be configured to accept payment information from the user 102 over the network 160.

Each of the seller servers or devices 140, in one embodiment, may include at least one seller identifier 148, which may be included as part of the one or more items and/or services made available for purchase so that, e.g., particular items and/or services are associated with particular sellers. In one implementation, the seller identifier 148 may include one or more attributes and/or parameters related to the seller, such as business and banking information. User 102 may conduct transactions such as financial transactions (e.g., selection, monitoring, purchasing, and/or providing payment for items and/or services) with each seller server 140 via the service provider server 180 over the network 160.

The service provider server 180, in one embodiment, may be maintained by a transaction processing entity, which may provide processing for financial transactions and/or information transactions between the user 102 and one or more of the seller servers 140. As such, the service provider server 180 includes a service application 182, which may be adapted to interact with each user device 120 and/or each seller server 140 over the network 160 to facilitate the tracking and identification of the user 102 as well as the selection, purchase, and/or payment of items and/or services by the user 102 from one or more of the seller servers 140. In one example, the service provider server 180 may be provided by PayPal®, Inc. and/or eBay®, Inc. of San Jose, Calif., USA.

The service application 182, in one embodiment, utilizes a payment processing module 184 to process purchases and/or payments for financial transactions between the user 102 and each of the seller servers 140. In one implementation, the payment processing module 184 assists with resolving financial transactions through validation, delivery, and settlement. As such, the service application 182 in conjunction with the payment processing module 184 settles indebtedness between the user 102 and each of the seller servers 140, wherein accounts may be directly and/or automatically debited and/or credited of monetary funds in a manner as accepted by the banking industry.

The service provider server 180, in one embodiment, may be configured to maintain one or more user accounts and seller accounts in an account database 192, each of which may include account information 194 associated with one or more individual users (e.g., user 102) and sellers (e.g., one or more sellers associated with seller servers 140). For example, account information 194 may include private financial information of each user 102 and each seller associated with the one or more seller servers 140, such as one or more account numbers, passwords, credit card information, banking information, or other types of financial information, which may be used to facilitate financial transactions between the user 102 and the one or more sellers associated with the seller servers 140. In various aspects, the methods and systems described herein may be modified to accommodate users and/or sellers that may or may not be associated with at least one existing user account and/or seller account, respectively.

In one implementation, the user 102 may have identity attributes stored with the service provider server 180, and the user 102 may have credentials to authenticate or verify identity with the service provider server 180. User attributes may include personal information, banking information and/or funding sources as previously described. In various aspects, the user attributes may be passed to the service provider server 180 as part of a login, selection, purchase, and/or payment request, and the user attributes may be utilized by the service provider server 180 to associate the user 102 with one or more particular user accounts maintained by the service provider server 180.

The system described above with respect to the embodiment of FIG. 1 may be used to track customer information such as the location of customers by their user devices and associate identity information with their user devices.

Figure 2:
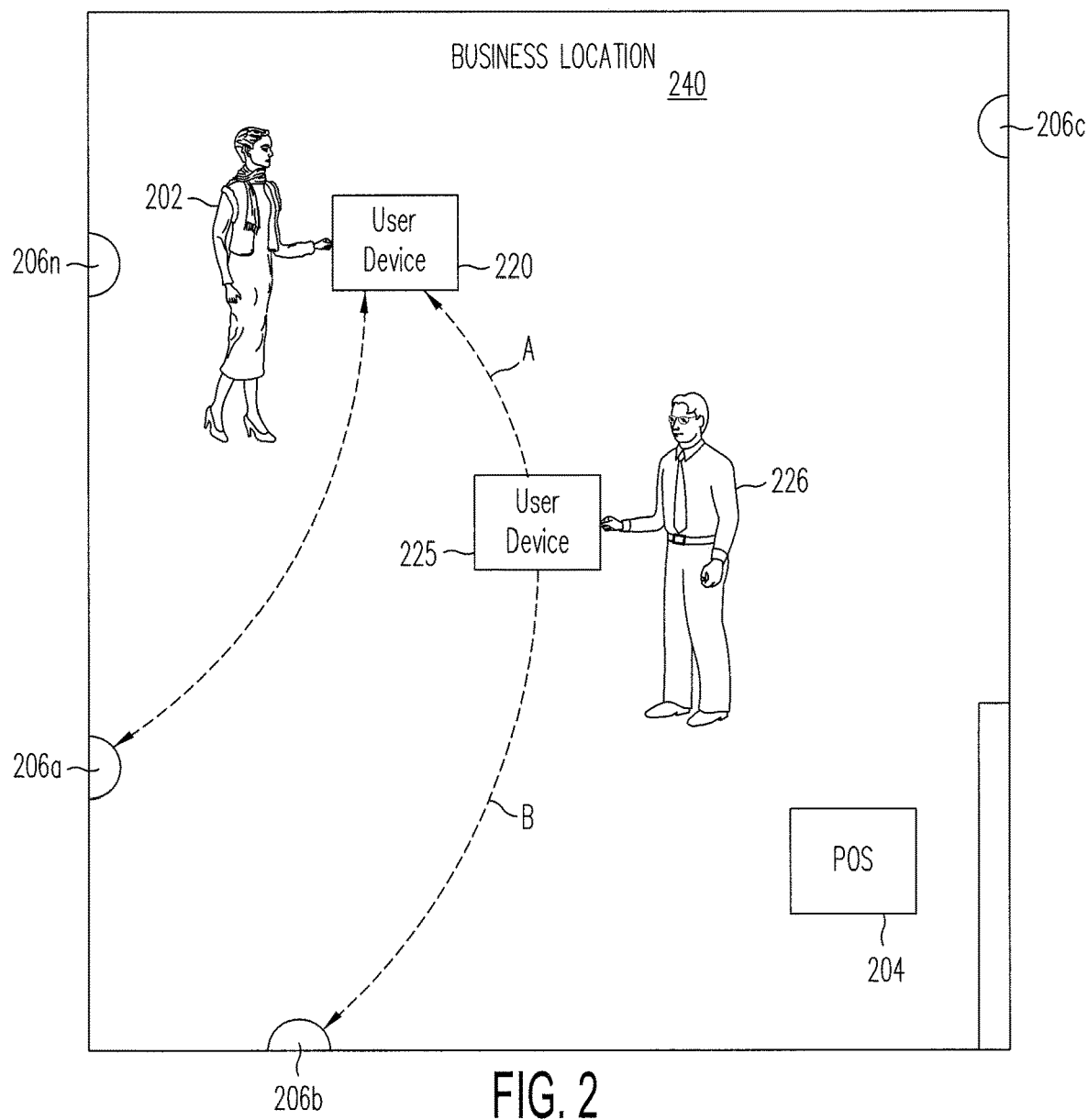
FIG. 2 is a diagram illustrating a system for tracking user device information at a business location according to another embodiment of the present disclosure.

Referring now to FIG. 2, a diagram illustrates a system for tracking user device information at a business location according to another embodiment of the present disclosure.

According to one or more embodiments, a business location 240 may have one or more sensors 206*a* . . . 206*n* (where n is an integer number) located throughout the premises of business location 240. As described above, business location 240 may be a place where transactions are conducted such as a retail store. Sensors 206*a* . . . 206*n* may be positioned on or within any surface such as walls, fixed or modular furniture, racks, shelves or on any other suitable location in business location 240. Sensors 206*a* . . . 206*n* may include any device that is adapted to detect the proximity of user devices. For example, WiFi packet sniffing, near field communication (NFC) or other suitable technologies may be used for detecting user devices. In an embodiment, sensor 206*a* may detect a mobile device 220 of a customer 202 that may be interested in conducting a transaction, e.g., purchasing an item, from business location 240.

As customer 202 moves around business location 240, sensors 206*a* . . . 206*n* may detect the mobile device 220 based on the mobile device's unique identification signals. In embodiments where mobile device 220 is a web-enabled device, the mobile device may be identified by its unique network identifiers. The multiple sensors 206*a* . . . 206*n* thus track the presence and movement of customers inside business location 240. This information may be useful to business entities for any number of purposes, including, for example, general analytics, store layout, customer flow, and the departments or products of interest to specific customers.

As described above with respect to FIG. 1, in an embodiment where a user device such as user device 220 (or user device 120 in FIG. 1) includes a downloaded application and one or more detectors, such a user device may detect and track other nearby user devices such as a user device 225 of user 226 (as indicated by line A), which may come into a proximity of user device 220. Notably, user device 225 of user 226 may also be detected and tracked (as indicated by line B) by sensors 206*a* . . . 206*n* as user 226 moves around business location 240.

Thus, a distributed network of sensors is created, which may include fixed sensors within business locations, which may be positioned at known locations and are always available, and which may be supplemented by detectors running on one or more user devices as described above with respect to the embodiment of FIG. 1.

Figure 3:
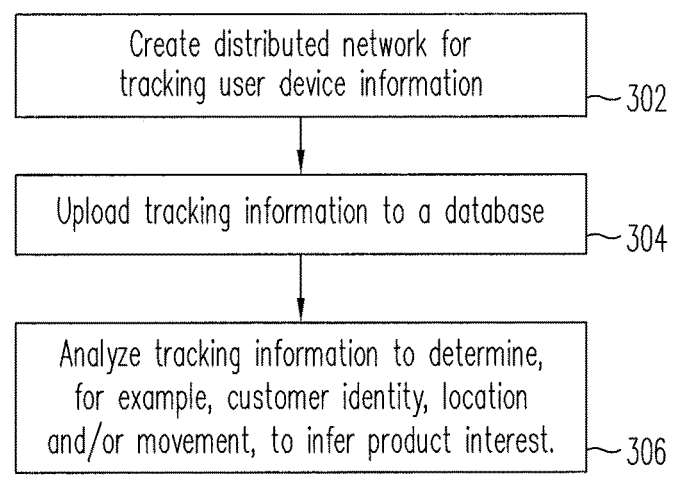
FIG. 3 illustrates a method for tracking and identifying customers associated with a user device according to an embodiment of the present disclosure.

Referring now to FIG. 3, a method for tracking and identifying customers associated with a user device is illustrated according to an embodiment of the present disclosure.

In block 302, a distributed network of sensors may be created for tracking user device information.

As described above according to one or more embodiments, a distributed network of sensors that tracks customer information or data may be created by positioning one more fixed sensors throughout a place of business, for example, as illustrated in the embodiment of FIG. 2, which may be supplemented with detectors in one or more user devices, for example, as illustrated in the embodiment of FIG. 1, wherein users of certain user devices may install and run an application that detects other nearby user devices. In the embodiment of FIG. 2, the sensors may be generally fixed. In the embodiment of FIG. 1, the sensors may be potentially in motion as a user device having the downloaded application moves around a given location.

In various embodiments, the distributed network of sensors may just include fixed sensors deployed at a business location that detect nearby user devices (e.g., as described in the embodiment of FIG. 2). In other embodiments, the distributed network of sensors may just include user devices of users that download and run a tracking application on their user devices such that the user devices may detect other nearby user devices (e.g., as described in the embodiment of FIG. 1). In further embodiments, the distributed network of sensors may include the fixed sensors at a business location possibly augmented by sensors in users' devices having the downloaded tracking application.

With respect to an embodiment as illustrated in FIG. 1, an application may be provided to users, which users may choose to install and run on their user devices. The application may be provided for downloading from a seller or a service provider, for example, a seller associated with seller server 140 or a service provider associated with service provider server 180 illustrated in FIG. 1 according to an embodiment. In one embodiment, when user 102 (referring to FIG. 1) has a pre-existing account with service provider server 180 wherein user 102 has identity attributes stored with service provider server 180 as described above, user 102 may download the application on user device 120 from service provider server 180.

The application, once downloaded in the user device, may utilize the user device Wi-Fi, for example, to detect other nearby user devices that may come into proximity of the user device, even ones not running the application. For example, a user may turn on the application on his or her user device while shopping in a retail store, which may detect other user devices associated with other customers shopping in the proximity in the retail store. In that regard, the user device having the downloaded application may detect other nearby user devices when they come within a certain distance, area or radius, or when the other nearby users are within a certain hotspot WiFi, Bluetooth range, or the like. An appropriate proximity may be when the user device having the downloaded application comes within a radius of another nearby user device set at approximately 50 yards, 100 yards, 150 yards, etc., or when another user device is standing in the vicinity, or in front of the user device having the downloaded application.

With respect to an embodiment as illustrated in FIG. 2, sensors may be used in a business location to detect the proximity of user devices such as cell phones. In that regard, sensors or other suitable detection technology may be used inside the business location, for example, "in-store" sensors may be used throughout the business location as described above. Customer tracking information or data from the "in-store" sensors may be augmented or supplemented by tracking information from any present user devices running a tracking application.

Unique user devices may be identified based on the user devices' unique identification signals. In one or more embodiments where the user devices are web-enabled, unique user devices may be identified by their unique network identifiers.

The presence and movements of customers associated with the user devices throughout the business location are tracked.

Once information about the user devices has been obtained, for example, the locations of one or more user devices as illustrated in FIGS. 1 and 2, the owners or users themselves may be associated with their corresponding user devices. Users may be associated with their user devices in any number of ways. For example, at a point of sale location where the user discloses his or her identity when paying by a credit card or other transaction card, or when using a club or rewards card. In another example, users may be associated with their user devices by having the users register their user devices with the service in exchange for an incentive such as a reward or contest entry. As such, the identification and tracking of users who have not opted into the system may be obtained. In that regard, one or more embodiments herein may be used to discover, identify and/or track customers who have user devices without them necessarily being aware or opting into or participating in the system.

In block 304, tracking information such as user device information and associated owner or user information may be uploaded to a tracking database, which may be used for later analysis. In an embodiment, tracking information may be stored even for unidentified users, then later, when a user is identified, the information may become useful.

In the embodiment of FIG. 1, the sensors may be potentially in motion as a user device having the downloaded application moves around a given location. In that regard, user devices may upload the information associated with the nearby user devices to a tracking database, even for those nearby user devices not running the application. The tracking database may be maintained by a seller server or by a service provider server, for example, seller tracking database 142 or service provider tracking database 196 as illustrated in the embodiment of FIG. 1. The information may include, for example, the locations of nearby user devices. Optionally, customers or users may be given incentives such as rewards or an entry in a contest, for running the application and uploading or providing the information associated with the other nearby user devices.

In the embodiment of FIG. 2, the sensors may be generally fixed. In that regard, tracking information associated with one or more user devices, which is detected by the fixed sensors, may also be uploaded to a tracking database maintained by a seller server or by a service provider server.

In some embodiments, a single sensor may not be able to determine tracking information, for example the location of a user, but by combining information from multiple sensors, for example with sensors located throughout a store, it may be possible to determine the user's location.

In block 306, the tracking information may be analyzed to determine, for example, customer identity, location and/or movement, to infer product interest. Once the user's identity is associated with a particular user device, the information may be used along with the previously-gathered tracking information, to understand what products interest specific users or customers, at all stores that he or she visits. Tracking information stored in a tracking database, which may include customer movement or location, may be useful to business entities for any number of reasons, including, for example, conducting general analytics, store layout, customer flow, and the departments or products of interest to specific customers.

Advantageously, according to one or more embodiments herein, a distributed network of sensors for tracking information associated with nearby user devices such as the locations of all nearby user devices may be created. The network of sensors may be used to gather information about signals (e.g., radio signals) transmitted by the user devices. For example, the raw signal strength information along with the known locations of the sensors may be converted into user device locations.

Figure 4:
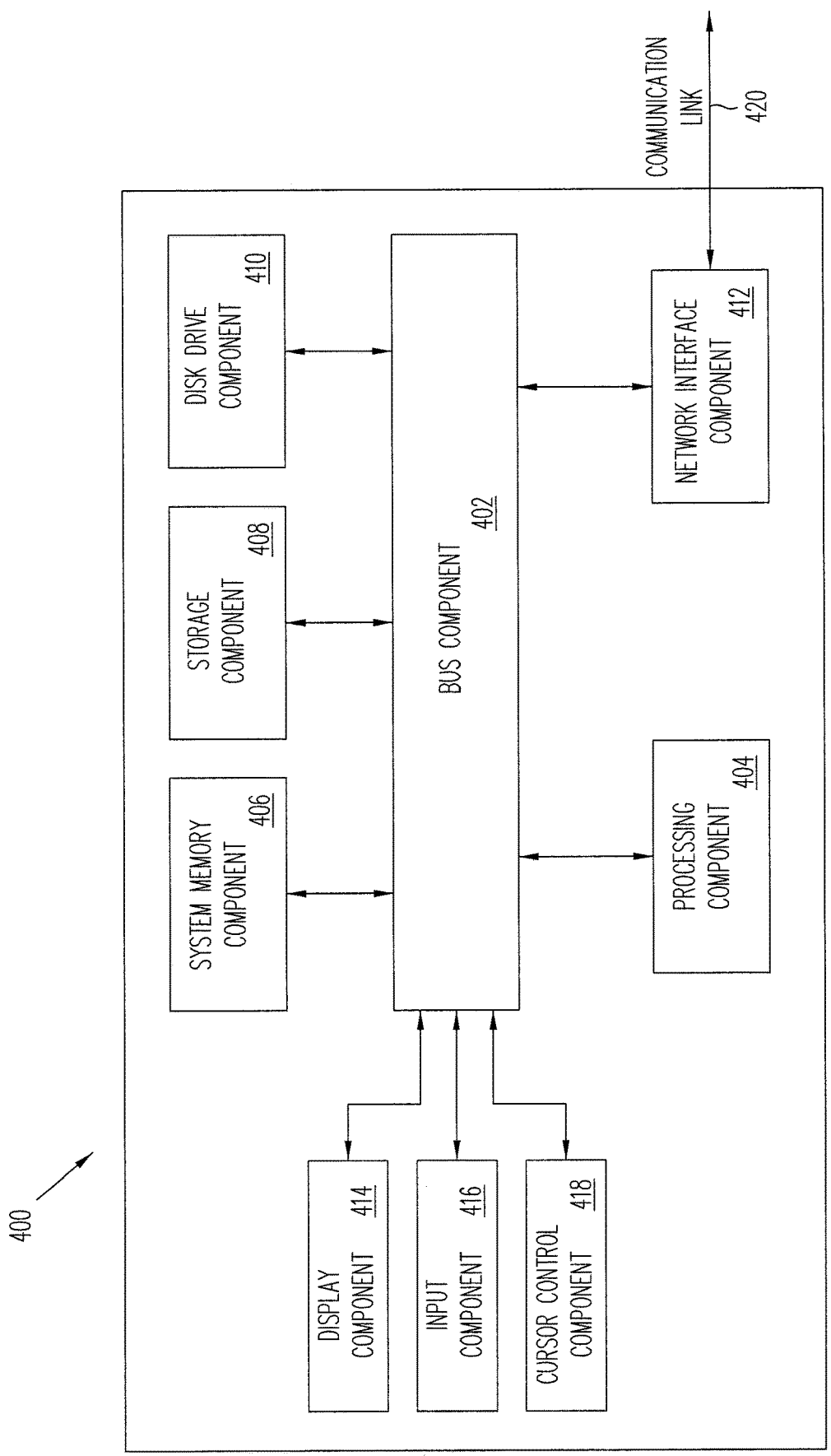
FIG. 4 illustrates a block diagram of a system for implementing a device according to one embodiment of the present disclosure.

FIG. 4 is a block diagram of a system 400 suitable for implementing embodiments of the present disclosure, including user device 120, one or more seller servers or devices 140, and service provider server or device 180. System 400, such as part of a cell phone, mobile phone, smart phone, tablet, personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to process financial transactions, make payments, etc. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for payments or transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. System 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Although various components and steps have been described herein as being associated with user device 120, seller server 140, and payment service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A mobile device comprising:
one or more detectors or sensors;
one or more hardware processors; and
one or more non-transitory memories in communication with the one or more hardware processors and adapted to store a plurality of machine-readable instructions which when executed by the one or more hardware processors are configured to cause the mobile device to perform operations comprising:
   detecting a launch of an application on the mobile device that is associated with an identified user;
   enabling detecting and tracking, via the one or more detectors or sensors, of one or more user devices that are each located within a predetermined distance of the mobile device, that are each not running the application, and that are each associated with an unidentified user;
   capturing, by the one or more detectors or sensors during the tracking of the one or more user devices, first signal strength information of radio signals transmitted by the one or more user devices;
   transmitting unique identification signals that are detected by one or more fixed sensors located at a place of business as the identified user moves within the place of business with the mobile device, wherein second signal strength information of the unique identification signals is determined by the one or more fixed sensors to determine a location of the mobile device;
   uploading, based on the tracking, user device information associated with the one or more user devices to a tracking database, wherein the user device information is stored for unidentified users corresponding to the one or more user devices, and wherein the user device information includes the first signal strength information of the radio signals transmitted by the one or more user devices; and
   determining a location of the one or more user devices based on the first signal strength information and the location of the mobile device that is based on the second signal strength information.

2. The mobile device of claim 1, wherein the operations further comprise augmenting the user device information detected from the one or more fixed sensors located at the place of business using the uploaded tracked user device information.

3. The mobile device of claim 1, wherein the application operates on its own without the one or more fixed sensors to determine the location of the mobile device, wherein the location of the mobile device is provided with the user device information associated with the one or more user devices.

4. The mobile device of claim 1, wherein the operations further comprise
receiving one or more incentives for running the application.

5. The mobile device of claim 1, wherein the user device information further comprises locations of the one or more user devices.

6. The mobile device of claim 1, wherein the detectors or sensors use at least one of WiFi packet sniffing, Bluetooth, or near field communication (NFC).

7. The mobile device of claim 1, wherein the mobile device is one of a wireless phone, a smart phone, a tablet, a personal computer or a personal digital assistant.

8. The mobile device of claim 1, wherein the operations further comprise downloading the application from a service provider server or a merchant server.

9. The mobile device of claim 1, wherein the operations further comprise conducting a transaction in connection with one or more items or services with a merchant server via a service provider server.

10. The mobile device of claim 1, wherein the operations further comprise:
associating identity information of the identified user with the mobile device; and
determining specific interests of the identified user at a plurality of business locations that the identified user visits based on the identity information and previously gathered user device information.

11. The mobile device of claim 1, wherein the tracking database is at a service provider server or at a seller server.

12. The mobile device of claim 1, wherein the operations further comprise passing a user identifier that includes one or more attributes related to the unidentified user to a service provider server that associates the unidentified user(s) with a particular user account maintained by the service provider server.

13. The mobile device of claim 1, wherein a location of the one or more fixed sensors located at the place of business, the second signal strength information of the unique identification signals provided by the mobile device, and the first signal strength information of radio signals transmitted by the one or more user devices and detected by the one or more detectors or sensors are provided to a service provider server to determine the location of the one or more user devices.

14. The mobile device of claim 1, wherein the operations of detecting and tracking the one or more user devices located within the predetermined distance of the mobile device are performed as the user moves within the place of business.

15. A method comprising:
 detecting a launching of an application on a mobile device that is associated with an identified user;
 detecting and tracking, via one or more detectors or sensors of the mobile device, of one or more user devices that are each located within a predetermined distance of the mobile device, that are each not running the application, and that are each associated with an unidentified user;
 capturing, by the one or more detectors or sensors during the tracking of the one or more user devices, first signal strength information of radio signals transmitted by the one or more user devices;
 transmitting unique identification signals that are detected by one or more fixed sensors located at a place of business as the identified user moves within the place of business with the mobile device, wherein second signal strength information of the unique identification signals is determined by the one or more fixed sensors to determine a location of the mobile device;
 uploading, based on the tracking, user device information associated with the one or more user devices to a tracking database, wherein the user device information is stored for unidentified users corresponding to the one or more user devices, and wherein the user device information includes the first signal strength information of the radio signals transmitted by the one or more user devices; and
 determining a location of the one or more user devices based on the first signal strength information and the location of the mobile device that is based on the second signal strength information.

16. The method of claim 15, further comprising supplementing, by the one or more detectors or sensors of the mobile device, a distributed network of sensors that includes the one or more fixed sensors located throughout the place of business.

17. The method of claim 15, wherein the detecting and the tracking via the one or more detectors or sensors are performed as the mobile device moves within the place of business.

18. The method of claim 15, wherein the detecting and tracking of the one or more user devices located within the predetermined distance of the mobile device are performed on the one or more user devices that come into a certain distance, area or radius, or within a certain hotspot WiFi or Bluetooth range of the mobile device.

19. The method of claim 15, wherein the user device information further comprises locations of the one or more user devices.

20. A non-transitory machine-readable medium having stored thereon machine-readable instructions executable to cause a machine to perform operations comprising:
 detecting a launching of an application on a mobile device that is associated with an identified user;
 enabling detecting and tracking, via one or more detectors or sensors of the mobile device, of one or more user devices that are each located within a predetermined distance of the mobile device, that are each not running the application, and that are each associated with an unidentified user;
 capturing, by the one or more detectors or sensors during the tracking of the one or more user devices, first signal strength information of radio signals transmitted by the one or more user devices;
 transmitting unique identification signals that are detected by one or more fixed sensors located at a place of business as the identified user moves within the place of business with the mobile device, wherein second signal strength information of the unique identification signals is determined by the one or more fixed sensors to determine a location of the mobile device;
 uploading, based on the tracking, user device information associated with the one or more user devices to a tracking database, wherein the user device information is stored for unidentified users corresponding to the one or more user devices, and wherein the user device information includes the first signal strength information of the radio signals transmitted by the one or more user devices; and
 determining a location of the one or more user devices based on the first signal strength information and the location of the mobile device that is based on the second signal strength information.

\* \* \* \* \*